United States Patent [19]

Hoagland

[11] Patent Number: 5,919,574
[45] Date of Patent: Jul. 6, 1999

[54] BIODEGRADABLE LAMINATED FILMS FABRICATED FROM PECTIN AND CHITOSAN

[75] Inventor: Peter D. Hoagland, Schwenksville, Pa.

[73] Assignee: The United States of America, as represented by the Secretary of Agriculture, Washington, D.C.

[21] Appl. No.: 08/580,663

[22] Filed: Dec. 29, 1995

[51] Int. Cl.⁶ .............................. C08L 5/06; C08L 5/08; C09D 105/06; C09D 105/08
[52] U.S. Cl. .............................. 428/532; 536/2; 536/20; 106/210; 127/29
[58] Field of Search .................... 428/532, 533, 428/534; 536/123, 2, 102, 20; 524/27, 55, 47; 127/32, 33, 29

[56] References Cited

U.S. PATENT DOCUMENTS

| | | | |
|---|---|---|---|
| 2,542,052 | 2/1951 | Owens et al. | 18/37 |
| 5,089,307 | 2/1992 | Ninomiya et al. | 428/35.2 |
| 5,213,887 | 5/1993 | Huffman | 428/323 |
| 5,306,550 | 4/1994 | Nishiyama et al. | 428/288 |
| 5,318,780 | 6/1994 | Viegas et al. | 424/427 |
| 5,358,784 | 10/1994 | Hammer et al. | 428/34.8 |
| 5,370,914 | 12/1994 | Hammer et al. | 428/34.8 |
| 5,451,673 | 9/1995 | Fishman et al. | 536/123 |

FOREIGN PATENT DOCUMENTS

| | | |
|---|---|---|
| 400484 | 12/1990 | European Pat. Off. . |
| 622179 | 11/1994 | European Pat. Off. . |
| 649870 | 4/1995 | European Pat. Off. . |
| 665263 | 8/1995 | European Pat. Off. . |
| 2227464 | 9/1990 | Japan . |
| 322812 | 12/1995 | Japan . |
| 7322812 | 12/1995 | Japan . |

OTHER PUBLICATIONS

Pectin Biopolyblends and Composites for Value Added Polymer Products, CRIS Report, Jan. 1995.

Ullrich, S., "Development of Pectin–Chitosan Coacervate Capsules for Immobilizing of Cultured Plant Cells", *Food Biotechnol.*, N Y 4(1), 1990, p. 489, (no month).

Meshali and Gabr, "Effect of interpolymer complex formation of chitosan with pectin or acacia on the release behaviour of chlorpromazine HC1", *Int. J. of Pharm.*, 89 (1993) 177–181 (no month).

*Primary Examiner*—John J. Zimmerman
*Assistant Examiner*—Michael LaVilla
*Attorney, Agent, or Firm*—M. Howard Silverstein; John D. Fado; Janelle S. Graeter

[57] ABSTRACT

High modulus, flexible laminated films may be fabricated from chitosan and pectin. Either glycerol or lactic acid as plasticizer and, optionally, starch may also be blended with either the pectin or chitosan solutions used for film preparation. The laminated films are biodegradeable, and the components are derived from renewable agricultural products.

20 Claims, 6 Drawing Sheets

Lamination Methods

BIODEGRADABLE LAMINATED FILMS FABRICATED FROM PECTIN AND CHITOSAN

BACKGROUND OF THE INVENTION

Biodegradable films made from renewable, stable agricultural products are of increasing scientific and commercial interest. Multiple uses, ease of disposal and the replacement of petroleum-based raw materials with renewable agricultural products make these types of films excellent candidates for commercial development. They may be used to replace some petroleum-based films or in new specialized niche areas such as ocean disposable bags made available by increasing environmental concerns.

This invention relates to novel laminated films fabricated from pectin and chitosan. The films are high modulus, flexible and self-supporting and are advantageous in that all materials are derived from agricultural products.

DESCRIPTION OF THE PRIOR ART

The film-forming properties of several water soluble polysaccharides have been studied. Films useful for coatings made from alginates and carrageenans were disclosed by Kester et al. (*Food Technology.* 1986. vol. 12(1), pp. 47–59). Paper coatings and similar applications of carboxymethyl cellulose and other cellulose ethers have been investigated, and studies of chitin and chitosan films, including self-supporting films, have also been carried out (Averback, Proceedings First International Conference. 1979. pp. 199–209; Hosokawa et al., *Ind. Eng. Chem. Res.* 1990. vol. 29, pp. 309–324; Wong et al. 1990. UJNR Protein Panel, 19th Meeting, San Diego, Calif.).

A few studies were carried out on pectin films in the 1930's and 1940's (Henglein et al. 1936. *Chemisch Berichte.* vol. 69(B), pp. 309–324; Maclay et al. 1947. *Chemurgic Digest.* vol. 6(22), pp. 326–329; Schultz et al. 1948. *J. Colloid Sci.* vol. 3, pp. 53–62; Schultz et al. 1949. *J. Physical and Colloid Chem.* vol. 53, pp. 1320–1330); however, these studies generally involved derivatized pectins used with divalent cations such as calcium. A more recent work discussed blends of pectins and carboxymethyl cellulose for use as cigarette papers (Hind et al., U.S. Pat. No. 4,129,134, 1978). U.S. Pat. No. 2,542,052 (issued to H. S. Owens and T. H. Schultz, 1951) describes films made from low methoxyl (less than 7.4% methoxyl) pectin cross-linked with polyvalent cations. No other polymeric component was used. Fishman, M. L. and Coffin, D. R. (U.S. Pat. No. 5,451,673, 1995, herein incorporated by reference) described high modulus, flexible films fabricated from blends of pectin, starch and, optionally, plasticizers.

Films from composites of chitosan and cellulose have been made by casting dispersions on steel or chrome plates at elevated temperatures from 70° to 100° C. (Nishiyama, M. 1993. *Gekkan Fudo Kemikaru.* vol. 9, pp. 98–105). Some of these films contained glycerol and had good tensile strength. They were also readily biodegradable in either sea water or in soil (Hosokawa et al. 1990. *Ind. Eng. Chem. Res.* vol. 29, pp. 800–805; Nishiyama, 1993, supra).

Chitosan membranes can also be formed by making films rigid with crosslinking agents, such as glutaraldehyde (Uragami et al. 1994. *J. Membrane Sci.* vol. 88, pp. 243–251) or divalent metal ions, or with polyelectrolytes (Dutkiewicz et al. 1992. *Adv. Chitin Chitosan, Proc. Int. Conf.,* 5th. Brine et al. eds., pp. 496–505), including anionic polysaccharides, such as pectin. Chemically modified chitosan membranes can be used for separating ethanol from water by pervaporation (Lee, Y. M. 1993. *Desalination.* vol. 90, pp. 277–290), and chitosan membranes are being applied to water purification as well (Muzzarelli et al. 1989. *Carbohydr. Polym.* vol. 11, pp. 293–306). Chitosan coatings applied to fruits and vegetables reduce water loss and extend shelf life (El Ghaouth et al. 1991. *J. Food Process. Preserv.* vol. 15, pp. 113–117). Chitosan films have been investigated for controlled release of pharmaceuticals (Bonvin and de Bertorella. 1993. *Polym. Bull.* (Berlin). vol. 31, pp. 375–379).

There have been no reports, however, of laminated films comprising pectin and chitosan.

SUMMARY OF THE INVENTION

It has been discovered that chitosan films may be cast upon pectin films to give clear laminated films having dynamic mechanical properties similar to those of pectin films alone. In addition, plasticizers and/or starch may be added to either the chitosan or pectin solutions used for film preparation. Moreover, pectin-chitosan blends may also be utilized.

In accordance with this discovery, it is an object of the invention to provide novel films comprising pectin and chitosan layers, where the layers optionally comprise plasticizer and/or starch.

Other objects and advantages will become readily apparent from the following description.

DETAILED DESCRIPTION OF THE INVENTION

Figure 1A:
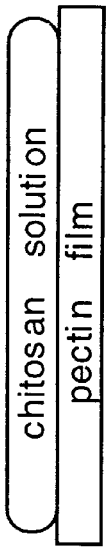
FIG. 1 shows various lamination configurations. A) chitosan solution cast on pectin film; B) pectin film on top of chitosan solution; C) pectin film on top of chitosan solution cast on pectin film; D) chitosan solution cast on pectin film on top of chitosan solution.
Figure 1B:
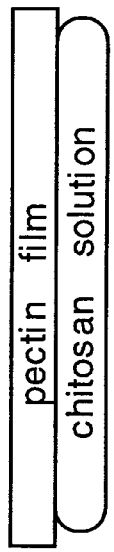
Figure 1C:
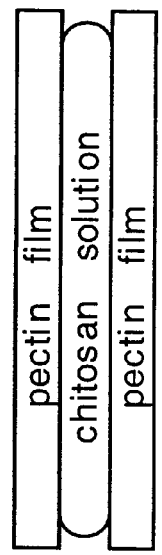
Figure 1D:
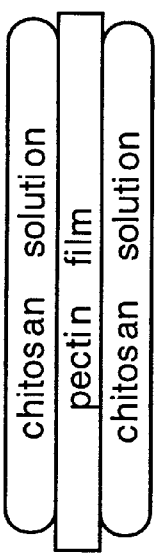

Pectin is one of several film-forming water soluble polysaccharides, and there are many agricultural sources of pectin which are currently underutilized. There is potentially a large volume of raw material from which pectin can be obtained since it is a major component of fruits and vegetables and is therefore plentiful in agricultural wastes. Examples of sources from which pectin may be obtained are many kinds of fruits including stone fruits such as peaches, pome fruits such as apples, citrus fruits such as limes, lemons, oranges and grapefruit, and vegetables such as sugar beets, cucumbers and squash.

Pectins are a class of water soluble complex polysaccharides found in the cell walls of higher plants. The backbone consists predominantly of blocks of poly(-galacturonic acid) residues interrupted by short rhamnose inserts. The rhamnose residues redirect the orientation of galacturonan segments to produce kinks which, upon aggregation, insure open structures favorable for gel formation. The galacturonate residues are methyl esterified to varying extents, depending on the plant source. Neutral sugars are present in side chains attached to the backbone. These materials have found extensive use in processed foods as a result of their gelling properties.

Isolation of pectin from plant cell walls is achieved by breaking up the gel structure, usually stabilized by calcium cations, to solubilize large aggregates of pectin. Various grades of pectin are commercially available in different degrees of methyl esterification and in different ranges of molecular weights, i.e. different degrees of disaggregation.

Pectin and starch blends can be used to make a range of films with very good properties (Coffin and Fishman. 1993. *J. Agric. Food Chem.* vol. 41, pp. 1192–1197). The scope of films made with pectin combined with other polysaccharides was widened to include chitosan for several reasons. First, chitosan is derived from chitin, the second most abundant polysaccharide on the earth, after cellulose (Lezica and Quesada-Allue. 1990. *Methods in Plant Biochem.* vol. 2, pp. 443–481), and is commercially available from a stable, renewable source, i.e. waste from the shellfish industry (Knorr, D. 1991. *Food Techn.* pp. 114–122). Second, chitosan forms good films and membranes. Third, the cationic properties of chitosan offer an opportunity to take advantage of electrostatic interactions with anionic, partially demethylated pectins.

Chitosan is a partially N-acetylated 2-deoxy-2-amino-α-glucan. Some heterotgeneity is introduced by the distribution of free amino groups that results from hydrolysis of some of the acetyl groups of the homopolysaccharide, chitin (Errington et al. 1993. *Int. J. Biol. Macromol.* vol. 15, pp. 113–115). The possibility of a combination of hydrogen bonding, electrostatic forces between carboxylate groups of pectin and protonated amino groups of chitosan, and compatible water activities to make possible a stable interface between a pectin film and a chitosan film was investigated. Very strong electrostatic interactions can be expected to produce a precipitate or a thin membrane, (Dutkiewicz et al., supra), therefore a moderately unesterified pectin (65% degree of methylation, DM), which forms good films with glycerol as plasticizer (Coffin and Fishman, supra), was selected for initial investigations with a readily available commercial chitosan.

Chitosan-pectin laminates were also an attractive possibility because a chitosan film laminated to a pectin film could be expected to alter water vapor permeability (WVP) and water solubility of pectin films. Chitosan films are compatible with animal tissue (Balassa and Prudden. 1978. *Proceedings of the First International Conference on Chitin/Chitosan.* Muzzarelli and Pariser, eds., pp. 296–305), including the human eye and are resistant to microbiological growth (Allan and Hadwiger. 1979. *Exp. Mycol.* vol. 3, pp. 285–287), including nematodes. When attacked by natural fungi, chitosan films have a built-in source of nitrogen to enhance biodegradation. They also offer the potential of membrane construction through crosslinking of amino groups or insolubilization through alteration of pH (Yang and Zall. 1984. *J. Food Sci.* vol. 49, pp. 91–93).

The particular pectin used is the most important factor in obtaining acceptable film properties, as described by Fishman, 1995, supra. Molecular weight, intrinsic viscosity, radius of gyration and degree of methyl esterification of the pectin molecule contribute to a considerable degree to the effectiveness of the pectin. High molecular weight, large radius of gyration and high intrinsic viscosity at an ionic strength of 0.05 or greater will provide a useful high modulus film. These particular properties can be determined by means well-known in the art.

Preferred pectins may be obtained from citrus, especially lime or lemon. Weight average molecular weights of at least about 100,000 are useful; however, above about 150,000 is preferred. Particularly preferred is above about 200,000. A radius of gyration measurement of about 25 mm is acceptable for film-making purposes. The intrinsic viscosity at ionic strength of 0.05 or greater should measure at least about 2.1 dl/g, preferably as high as possible. The degree of methyl esterification should be at least about 50%, preferably about 70%, most preferably about 76%.

Chitosan is an abundant substance and is readily available commercially.

Plasticizers may be added to obtain films which are more flexible and less susceptible to brittle failure. Many plasticizers are known in the art and have been used in other polymer systems. Acceptable plasticizers are lactic acid, glycerol, poly(alkylene) glycols, urea and polyhydroxy acids such as lactobionic, citric and mucic acids. Preferred are lactic acid and glycerol, while lactic acid is particularly preferred.

Selection of an appropriate plasticizer is made according to the ultimate required properties of the film. Glycerol was initially used for chitosan film laminates because Coffin and Fishman, 1993, supra found that brittleness of lime pectin and blended pectin/starch films could be effectively reduced by reasonable levels of glycerol.

Lactic acid was also selected as a plasticizer for chitosan films. The chitosan:lactic acid proportion was maintained at 1:1 because of limited solubility of chitosan at higher or lower proportions of acid. A number of films made with chitosan and acetic acid became hazy within a month. Apparently, in these films, chitosan formed localized precipitates as acetic acid slowly left the film. No such haze was observed in any of the films made with lactic acid over a period of up to four months.

Starch may also be included in either or both of the pectin and chitosan solutions. It is an inexpensive filler that reduces the cost of film preparations. In addition, it has other beneficial effects in that it is biodegradable and it controls the degree of tackiness of the film. Conventional starches are useful, although starches having a high amylose content result in better films. An amylose content of about 40% to about 80% is preferred, while an amylose content of about 50% to about 70% is particularly preferred. Starch is added as gelatinized starch and is prepared as described in Fishman, 1995, supra. Essentially, starch is mixed with water and heated above the boiling point of water under pressure for a sufficient time to break down starch granules. The process may be carried out in a microwave bomb, heating in a microwave oven. The solution is then cooled and added to the appropriate solution as desired (see Example 5).

The laminates of this invention can be made using conventional methods of solution casting and melt forming.

First, a pectin solution is cast and allowed to dry, followed by casting of the chitosan solution. It is not possible to cast pectin solutions on chitosan films because chitosan films swell on contact with water resulting in irregular laminates. A preformed pectin film, however, may be used to cover a chitosan solution. Possible variations of pectin-chitosan laminates are illustrated in FIG. 1, where it is shown that A) chitosan solution may be cast on pectin film; B) pectin films may be placed on top of chitosan solution; C) pectin film may be placed on top of chitosan solution cast on pectin film, forming a sandwich-type laminate of pectin-chitosan-pectin; or D) chitosan solution may be cast on pectin film placed on top of chitosan solution, forming a sandwich-type laminate of chitosan-pectin-chitosan. In addition, laminates may be stuck together with water to form laminates of any particular desired thickness. Laminates may also have a paper backing added merely by wetting the surface of the film and pressing the paper smoothly against it.

Pectin films are prepared as described by Fishman and Coffin, 1995, supra. Essentially, pectin is added to rapidly stirred distilled water, optionally containing plasticizer, for a viscous solution. The solution is stirred, filtered and filtrate poured directly onto a casting plate. Pectin solutions containing plasticizer are cast on a plate using a film applicator and allowed to dry. Chitosan solutions are prepared by adding chitosan to rapidly stirring water, optionally containing plasticizer. The solution is stirred, filtered, and filtrate is poured onto a casting plate or onto a preformed pectin film.

Pectin is present in solution at about 0.05% to about 2.5% (w/v), preferably about 2% (w/v). Plasticizer may be present at about 0.25% to about 2% (w/v), preferably about 1% (w/v). Starch may be present at a pectin/starch ratio of about 95/5 to about 75/25, preferably about 80/20. The pectin solution may be stirred for an amount of time sufficient for the pectin to dissolve and the solution to become viscous, typically about 4 hours and at a temperature of about 25° C. After stirring, the solution is filtered and poured directly onto the casting plate. After air drying, pectin films are dried at room temperature in a vacuum oven.

Chitosan is present in solution at about 0.05% to about 1.5% (w/v), preferably about 1% (w/v). Plasticizer is preferably present at a volume equal to that of the chitosan. Starch may be present at a chitosan/starch ratio of about 95/5 to about 75/25, preferably about 80/20. The chitosan solution may be stirred for an amount of time sufficient for the chitosan to dissolve and the solution to become clear, typically about 1 hour. After stirring, the solution is filtered and poured either directly onto the casting plate or onto a preformed pectin film. Plastic Petri dishes were found to be most compatible with chitosan films; the films tended to adhere too strongly to glass plates. Casting plates made of similar plastic materials are therefore preferred.

The laminates of the invention are useful for a number of applications including medicinal applications such as patches for the delivery of pharmaceuticals to skin; biodegradable, disposable pouches or bags for frozen or dried foods or soil additives; coatings for controlled release, adhesive bonding or protection; embedding and preserving agents for microscopic specimens; and encapsulation of living cells.

In accordance with the descriptions provided herein, one of skill in the art can made laminated films having a wide range of properties. The optional addition of starch, variations in the pectin/starch and/or the chitosan/starch ratios and the optional addition of plasticizer result in films having degrees of brittleness and tackiness as well as flexibility which can be tailored to meet the requirements dictated by the ultimate use of a particular film.

In addition to laminates comprising one or more layers of pectin and chitosan, pectin/chitosan blends (where chitosan is present as chitosan HCl) may also be prepared which are useful for film preparation. Chitosan HCl does not form a stable film unless pectin is added to prevent crystallization. Moreover, chitosan HCl/glycerol films shrank and became opaque as a result of crystallization. When pectin is added to chitosan acetate, lactate or other organic acid solutions, a precipitate forms. The substitution of alginate for pectin was investigated, however, alginate did not stabilize chitosan HCl films but instead formed insoluble precipitates. Thus there is a narrow window for chitosan/pectin blended films.

The addition of HCl provides water solubility over unlimited time. The chitosan HCl/pectin films have a storage modulus of about 10 times less than that for pectin films alone, thus they are particularly useful in applications such as disposable pouches. The films may be used alone, as are both pectin and chitosan films, or may be utilized as laminates, as described.

Chitosan solution is prepared by mixing chitosan (and optionally glycerol) in 0.1 N HCl and stirring. Chitosan is present at about 0.5% to about 2% (w/v), preferably about 1%. Glycerol may be present at about 0.05% to about 1.5% (w/v). Pectin solution is prepared by mixing pectin with distilled water in an amount from about 1% to about 4% (w/v), preferably about 2%. Both solutions are stirred for about 1 hr at room temperature, and the pectin solution is then combined with the chitosan solution. The solution is filtered, and the filtrate cast onto a casting plate. Gelatinized starch, prepared as described hereinabove, may also be added to the filtrate.

The following examples are intended only to illustrate the invention and are not intended to limit the scope of the invention as defined by the claims.

EXAMPLES

Example I

Film Preparation (FIG. 1)

Lime pectin (2–4 g) obtained from Grinsted Products, Inc. (Kansas City, Kans.) and methylated at 65% (Type 1200) was added to rapidly stirred water (200 ml) containing either glycerol(1%) or 85% lactic acid(1%). After 4 hr the viscous solution was filtered through glass wool. Filtrate (25–30 ml) was poured directly into a plastic Petri plate or onto a chitosan film preformed in a similar plastic Petri plate. Chitosan (2–4 g) obtained from Pronova Biopolymer, Inc. (Raymond, Wash.) and 15% acetylated (Seacure 240) was added to rapidly stirred water (200 ml) containing the same amount of lactic acid, according to the manufacturer's recommended procedure. After 1 hr, the clear solution was filtered through glass wool to remove undissolved bits of material. The chitosan-lactate filtrate (30 ml) was either poured directly into a polystyrene Petri dish or onto a pectin film preformed in a similar Petri dish. After air drying for at least 72 hr, the films were dried at room temperature in a vacuum oven for 30 min. Each film was easily peeled from the dish by inserting a razor blade at the film-rim interface and pulling up around the edge with forceps.

Pectin films cast on chitosan films had surface irregularities due to uneven shrinkage. Nevertheless, chitosan films could be cast on pectin films to give clear films without any noticeable features, including haze, at the interface. Laminated film thickness fell within the range of 0.10 to 0.15 mm.

Pectin films formed in 100-mm plastic Petri dishes were covered with 25–30 ml of chitosan solution (1–2%, w/v). The chitosan solution evaporated at room temperature to give a clear film on top of the pectin film with no distinguishable boundary.

A chitosan solution (25–30 ml, 1–2% w/v) spread out over the bottom of a 100-mm plastic Petri dish was covered with a pectin film peeled away from another Petri dish. The chitosan underlayer evaporated at room temperature to give a clear, smooth film with no distinguishable boundary.

Pectin films formed in 100-mm plastic Petri dishes were covered with 25–30 ml of chitosan solution (1–2%, w/v). The chitosan solution was covered with a pectin film peeled away from another Petri dish. A sandwich-type laminated film resulted which had a chitosan film between pectin films.

Onto a pectin film in a 100-mm Petri dish was added 3 ml water. A chitosan film, peeled away from another Petri dish was carefully pressed on top of the wetted surface of the pectin film in a manner that prevented entrapment of air spaces. The joined films were allowed to dry at room temperature to give a clear, smooth laminated film.

Example 2

Mechanical Testing of Laminates

Experiments were carried out to determine the effects of replacement of glycerol as plasticizer by lactic acid. Dynamic tests were performed with a Rheometrics RSA II solids analyzer (Piscataway, N.J.) using the special set of jaws for holding films. Liquid nitrogen was used for testing at below room temperature. A nominal strain of 0.1% and an applied frequency of 10 rad/s (1.59 Hz) were routinely used. Film strips, 7.0 mm×38.1 mm were excised from the center of the circular films with a razor blade. Sample thickness was measured with a Model No. 3 Dial Comparator micrometer, (B.C. Ames Co., Waltham, Mass.). The gap between jaws holding the film strip was set at 23.0 mm. Test results were analyzed with Rheometrics RHIOS v3.0.1 software run on an IBM PC MSDOS platform.

Figure 2:
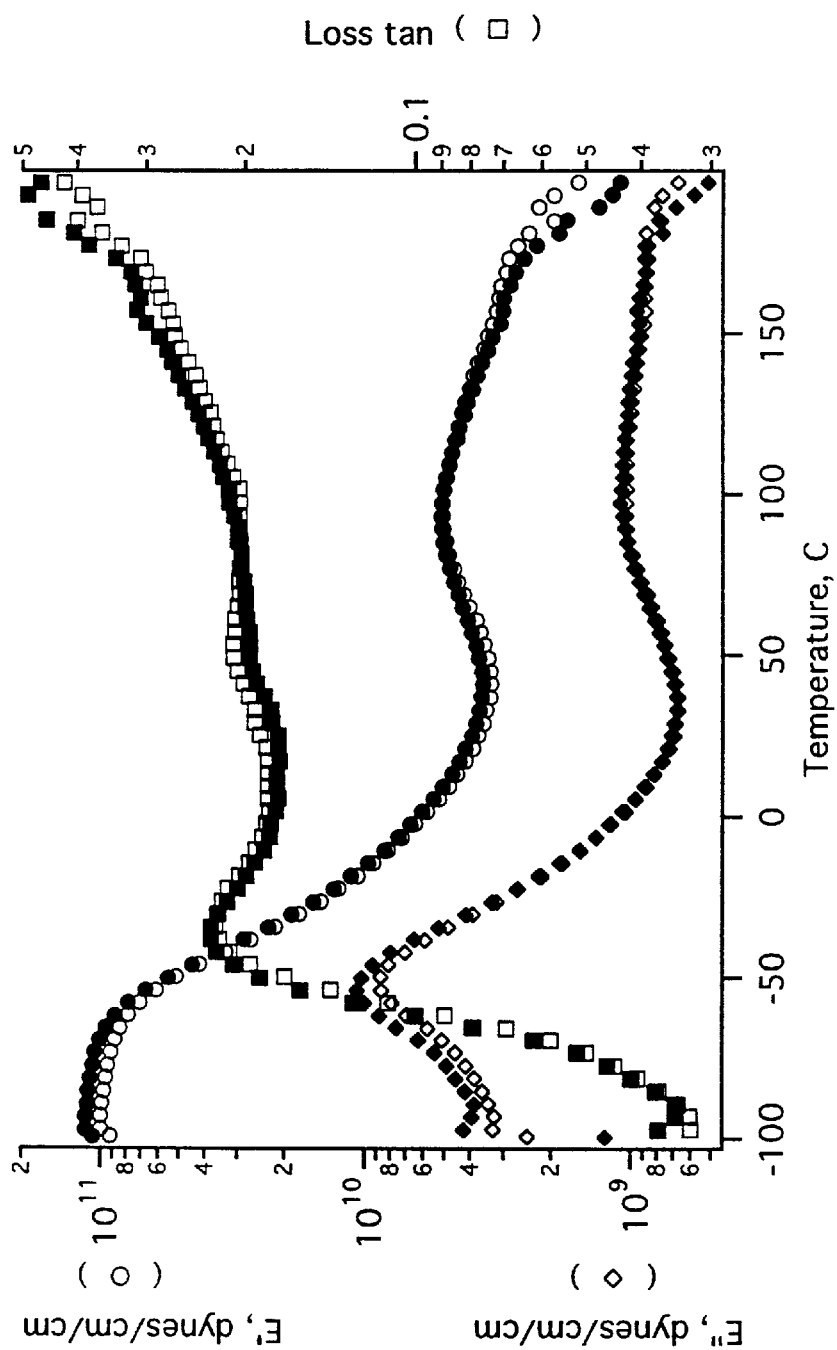
FIG. 2 shows the effects of replacement of glycerol (filled markers) with lactic acid (open markers) in pectin films on storage (E') and loss (E") modulus and loss tan.
Figure 3:
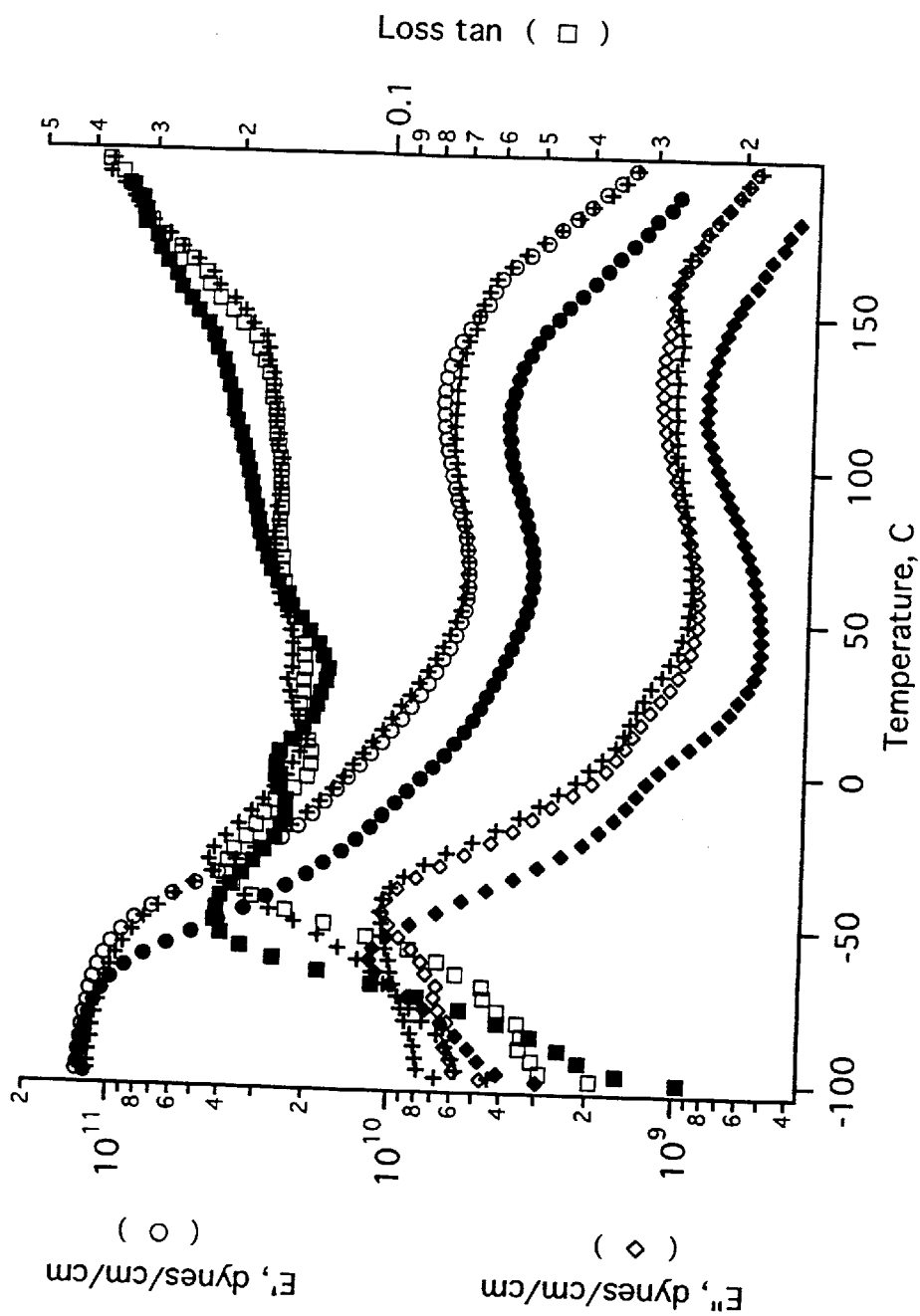
FIG. 3 shows the effect of replacement of glycerol (filled markers) with lactic acid (open markers) in pectin:chitosan laminate films of storage (E') and loss (E") modulus and loss tan. Responses from a laminate with an equal proportion of lactic acid and glycerol in the pectin foundation film are indicated by crosses.

The pectin films with lactic acid (2:1 g/dl) had properties similar to those for pectin films containing both glycerol and lactic acid in equal parts (2:0.5:0.5 g/dl, FIG. 2). No significant differences in storage moduli E', a measurement of stiffness, were observed when a low level of glycerol in pectin:glycerol:lactic acid:chitosan:lactic acid (2:0.5:0.5:1:1 g/dl) film was replaced with lactic acid (FIG. 3). Laminated films with a high level of only glycerol in the pectin film had lower storage E' and loss E" modulus values than those films made with lower levels of either glycerol-lactic acid, or lactic acid alone in the pectin film layer (FIG. 3). Loss modulus E" is a measure of slippage resulting in irreversible stretching. Good storage modulus E' values of $8-0 \times 10^{10}$ dyn/cm$^2$ near room temperature were obtained for laminated films of pectin:lactic acid:chitosan:lactic acid (2:1:1:1 g/dl, FIG. 3) and were significantly higher than the values for films from pectin:glycerol:chitosan:lactic acid (2:1:1:1 g/dl, FIG. 3).

Figure 4:
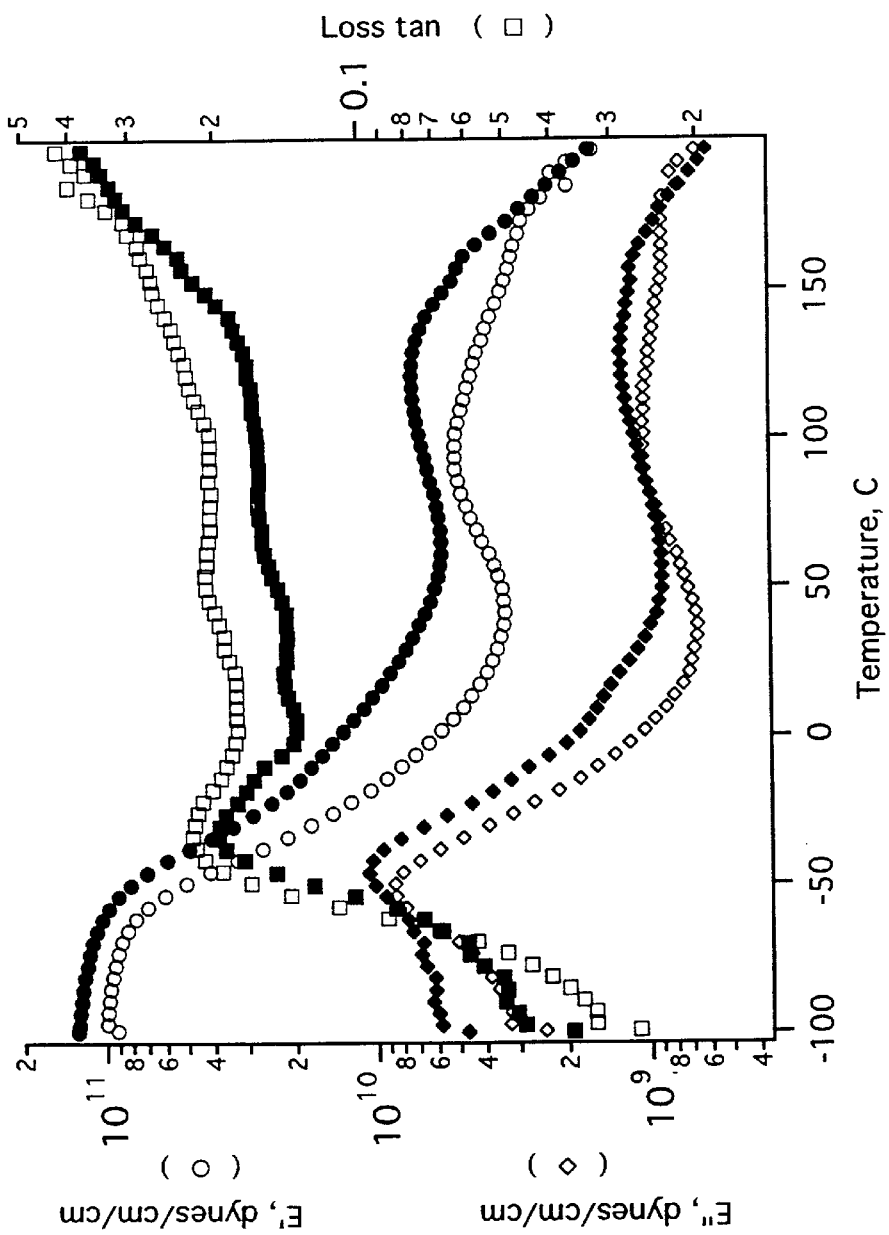
FIG. 4 shows the effect of lamination of chitosan:lactic acid film (filled markers) onto pectin:lactic acid film (open markers) on storage (E') and loss (E") modulus and loss tan.
Figure 5:
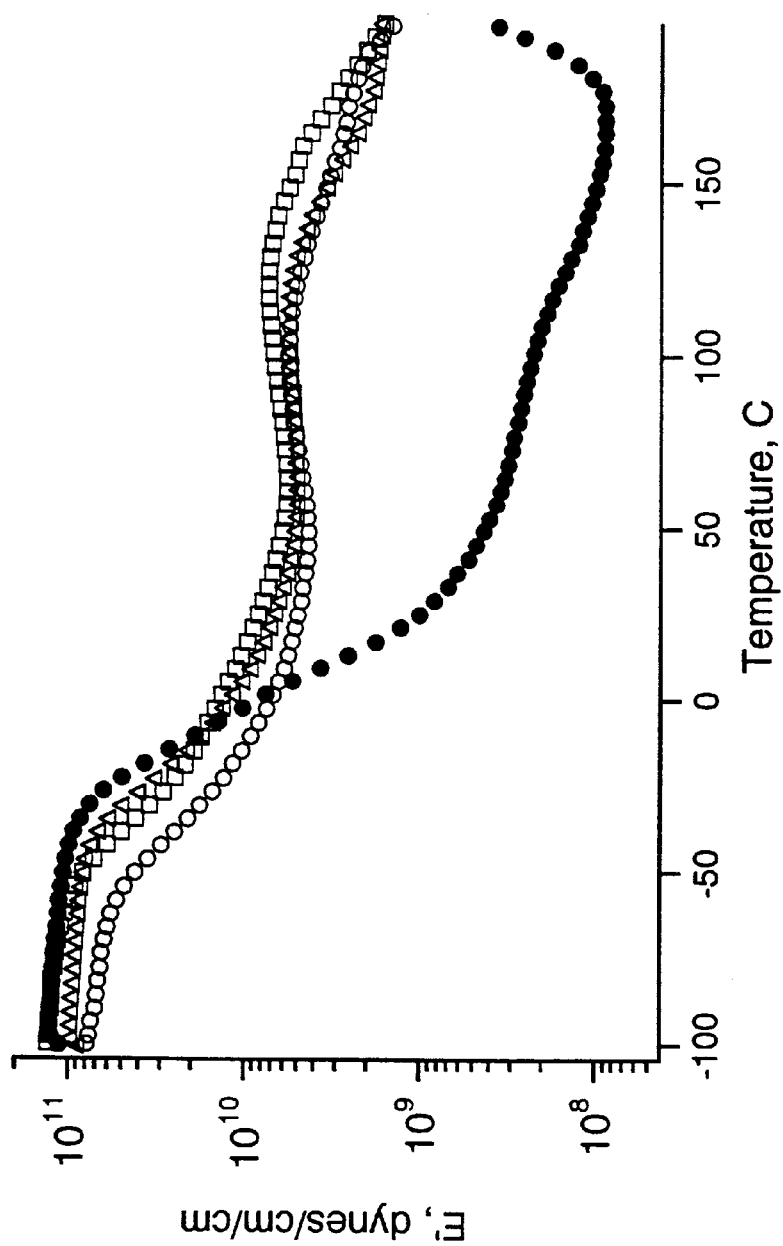
FIG. 5 shows the storage modulus for pectin:lactic acid film (P:LA=2:1, open circles), for chitosan:lactic acid film (C:LA=2:2, filled circles), and for laminates (P:LA:C:LA= 2:1:1:1, squares, and P:LA:C:LA=1:0.5:1:1, triangles).
Figure 6:
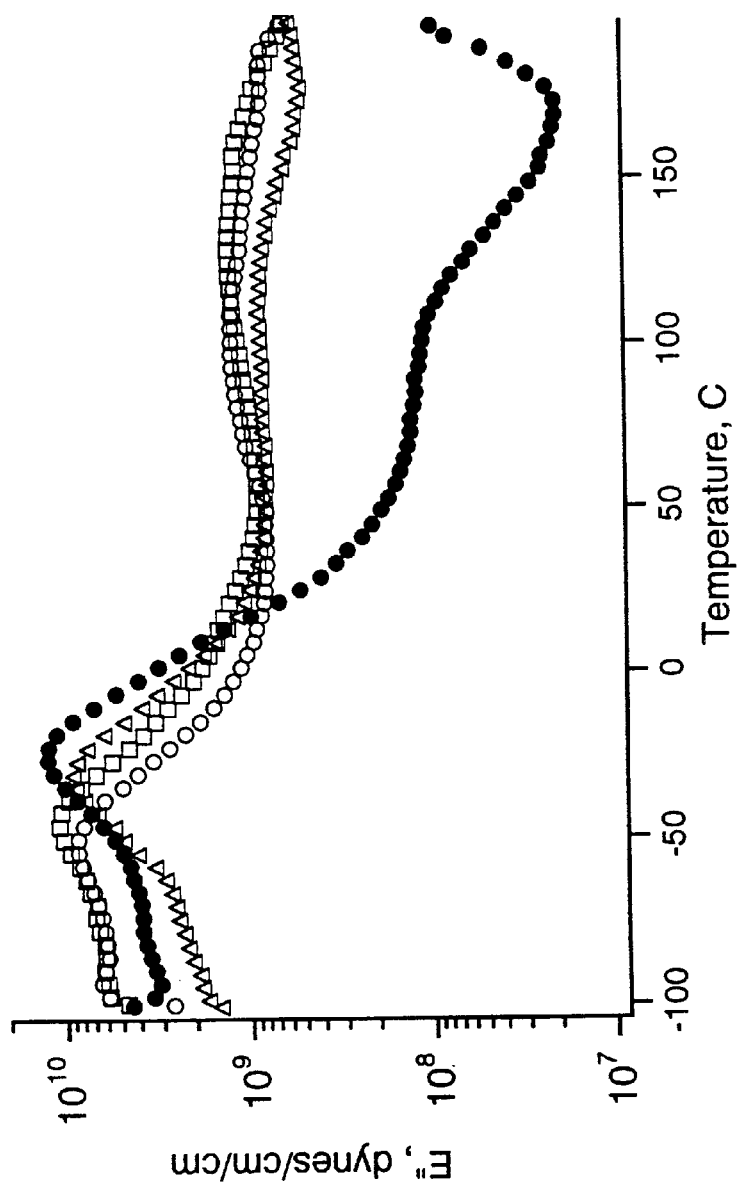
FIG. 6 shows loss modulus for pectin:lactic acid film (P:LA=2:1, open circles), for chitosan:lactic acid film (C:LA=2:2, filled circles), and for laminates (P:LA:C:LA= 2:1:1:1, squares, and P:LA:C:LA=1:0.5:1:1, triangles).

As shown in FIG. 4, the lamination of a chitosan:lactic acid film to a pectin:lactic acid film showed some increase in both storage E' and loss E" modulus within the temperature range of −100° C. to about 200° C. compared to the film cast from just pectin and lactic acid (unlaminated). As can be seen in FIG. 5, the storage E" modulus value for a film made from only chitosan and lactic acid dropped precipitously from near −30° to 50° C. Near room temperature the storage modulus E' was approximately $1 \times 10^9$ dyn/cm$^2$. The film from pectin:lactic acid (2:1 g/dl) had a storage modulus that stabilized from 0° to well over 100° C. and was from 5 to $8 \times 10^{10}$ dyn/cm$^2$ (FIG. 5). The loss modulus E" for films made from chitosan:lactic acid (2:2 g/dl) dropped below that for pectin:lactic acid (2:1 g/dl) above about 20° C. (FIG. 6). The laminated films of chitosan:lactic acid (1:1 g/dl) on pectin:lactic acid films at compositions of either (2:1 or 1:0.5 g/dl) had similar storage modulus E'—temperature profiles (data not shown). Some small structural irregularities were observed for laminated films made with the thin substrate (pectin:lactic acid 1:0.5 g/dl).

Example 3

Water Vapor Permeation Testing

The method of McHugh et al. (1994. *J. Food Sci.*, vol. 59, pp. 416–419) as adapted by Parris et al. (1995. *J. Agric. Food Chem.* vol. 43, pp. 1432–1435) was used to determine water vapor permeation of the films. Films were equilibrated in an environmental chamber (National Appliance Co., Portland, Oreg.) maintained at 50% RH and 25° C. prior to measurement. Replacement of glycerol by lactic acid in the foundation pectin film of the laminate resulted in an increase of water vapor permeability (WVP) of from 1.88±0.7 for pectin:glycerol:chitosan:lactic acid (2:1:1:1 g/dl) to 2.36±0.14 g*mm/(kPa*hr*m$^2$) for pectin:lactic acid:chitosan:lactic acid (2:1:1:1 g/dl). Unlaminated films of either pectin:lactic acid (2:1) or chitosan:lactic acid (2:2 g/dl) had comparable WVP values of 2.23±.20 and 2.25±0.15 g*mm/(kPa*hr*m$^2$), respectively.

Pectin:glycerol and/or lactic acid films cast on chitosan-:lactic acid films gave highly irregular laminates. In a few instances, the pectin film shrank away from the wall of the polystyrene Petri dish towards the center. This shrinkage occurred over the surface of the chitosan film and indicated, therefore, that there was very little ionic interaction between the protonated amino groups of the chitosan and the negatively charged carboxylate groups of the 65% methylated lime pectin. The irregular drying patterns of pectin films upon chitosan films might be attributable to differential water activity gradients set up by water loss from the pectin:glycerol solution through the chitosan film in addition to loss directly to air above the solution. Water loss through the chitosan film could be expected to follow known fractal percolation pathways (Adler, P. M. 1989. in *The Fractal Approach to Heterogeneous Chemistry.* Avnir, E. ed., John Wiley & Sons, New York, pp. 329–360) that could possibly contribute to uneven drying of the pectin:glycerol film. That chitosan films have lower WVP than pectin films may be a significant factor. Films from water soluble polysaccharides and/or proteins have usually been cast on water impenetrable surfaces such as glass, plastics or stainless steel. Chitosan films cast on pectin films, however, were optically clear and dried without structural irregularities.

The storage and loss modulus and loss tan temperature profiles in FIG. 2 for pectin:glycerol and pectin:lactic acid demonstrate that replacement of glycerol by lactic acid had negligible effect on the flexibility of the film. These results suggested that it would be a worthwhile alternative to employ lactic acid in the pectin films for lamination in place of glycerol.

Laminated films with low levels of lactic acid in the pectin film (2:1 or 1:0.5 g/dL) had storage and loss modulus values as high as or slightly higher than their counterparts made with 50% or 100% glycerol plasticizer compositions (FIG. 3). At present no particular flexibility advantage can be seen in using mixtures of glycerol and lactic acid for plasticizers in pectin foundation films, because, apparently, lactic acid alone preserves high storage and loss modulus values.

The small (<1 mm) structural irregularities observed in laminate films made with pectin:lactic acid at a level of 1:0.5 g/dL can be ascribed to insufficient thickness, since no such irregularities were seen when levels of pectin:lactic acid and/or glycerol at 2:1 were used in the foundation film. The loss of water from the chitosan:lactic acid solution that covers the pectin film was probably made complex by the assumed capture of some of this water by the pectin film before a final equilibrium condition (dry state was obtained for the laminate). That even those thinner (ca. 0.10 mm) laminates with structural irregularities had storage and loss moduli comparable to thicker (ca. 0.13 mm) completely clear laminates is noteworthy (FIG. 3).

The results from dynamical testing of both storage and loss modulus done on the laminated films support the following conclusions:

1) Replacement of glycerol by lactic acid in either pectin films alone or in pectin:chitosan laminates does not significantly change the storage or loss modulus.

2) When laminated to pectin films, lower storage and low modulus chitosan:lactic acid film give laminates with properties similar to that for pectin films alone.

It may well be that the less stiff chitosan film was made more stiff when one of its surfaces was in intimate contact with a stiff pectin film. Otherwise, the storage and loss modulus values might have been proportional to the amount of chitosan film laminated to the pectin film. These results also support the lamination of chitosan solutions directly to pectin or possibly blended pectin/starch films by direct casting and indicate that the resulting laminated films will have properties similar to the pectin foundation film. The laminate would then have one surface with the biocompatible properties, especially skin contact, of a chitosan film and the overall strength and flexibility of a pectin or blended pectin/starch film. In addition, the nitrogen content of the chitosan layer can be expected to improve biodegradability. Pectin:chitosan laminate films can be expected to be more resistant to water dissolution than pectin or blended pectin/starch films, because chitosan and pectin in solution react to form insoluble precipitates.

Pectin films made with glycerol had a significantly lower WVP ($1.88 \text{ g*mm/kPa*h*m}^2$) than Parris et al., supra, found for pectin alone. Fishman et al. (1993. *Carbohydr. Res.* vol. 248, pp. 303–316) found that in solution glycerol caused a break-up of pectin gel particles into smaller aggregates. Glycerol in a pectin film may therefore be expected to decrease WVP due to a partial collapse of the pectin gel network. This would also account for the decrease in pectin film brittleness observed by Coffin and Fishman, supra, with the addition of glycerol as a plasticizer. The higher value of $2.36 \text{ g*mm/(kPa*h*m}^2)$ measured for the WVP of the lactic acid laminate film suggests that lactic acid did not disrupt the pectin gel network to the extent that did glycerol. In the case of chitosan films, lactic acid is required for a stable non-crystalline network through initial solubilization of the polysaccharide. Apparently, lamination of chitosan:lactic acid film to pectin:lactic film does not have a significant effect on the WVP of either film. Perhaps the lactic acid in all these films controlled the WVP.

Example 4

Preparation of Pectin/Chitosan HCl Blends

A solution of 2.0 g of chitosan (SeaCure 343), 1.0 to 2.4 g of glycerol and 200 ml of 0.1 N HCl was prepared by mixing for 1 hr at room temperature. A solution of 0.5 to 2.0 g of lime pectin (Grinsted P1400, 76% methylated) and 50 ml water was prepared by mixing at room temperature for 1 hr. The pectin solution was combined with the chitosan solution, and the resulting clear solution was filtered through glass wool to remove traces of residual shell particles. Films were cast with 30 ml portions of filtrate poured into 100 mm plastic Petri dishes. In some instances, gelatinized starch (as described in Example 5) was added to the filtrate.

Example 5

Preparation of Gelatinized Starch Solutions

Gelatinized starch was prepared by mixing 0.5 g Amylomaize VII with 10 ml water in a Parr microwave bomb. The mixture was microwaved for 3 min at 50% power in a 700 Watt Amana Model R321T Radarange microwave oven. After cooling, the contents of the bomb were transferred to the appropriate pectin or chitosan solution. The gelatinized starch was then thoroughly mixed into the solution without introduction of air bubbles prior to film casting in 100 mm plastic Petri plates.

I claim:

1. A laminated film having one layer consisting essentially of pectin and at least one chitosan film layer, wherein said pectin and said chitosan are present in amounts effective for the formation of films, said pectin film layer and said chitosan film layers are attached such that a laminated film is formed, and said pectin has a high molecular weight, large radius of gyration, high degree of methyl esterification and high intrinsic viscosity at an ionic strength of at least 0.05.

2. The film of claim 1, wherein said molecular weight is at least about 100,000, said radius of gyration is at least about 25 nanometers, said degree of methyl esterification is at least about 50%, and said intrinsic viscosity is at least about 2.1 dl/g.

3. The laminated film of claim 1, wherein at least one of said pectin layer or said chitosan layer additionally comprises an effective amount of starch.

4. The laminated film of claim 3, wherein said starch is high amylose starch.

5. The laminated film of claim 4, wherein said amylose is at least about 40% of the starch composition.

6. The laminated film of claims 1 or 3, wherein at least one of said pectin layer or said chitosan layer additionally comprises an effective amount of plasticizer.

7. The laminated film of claim 6, wherein the plasticizer is selected from the group consisting of lactic acid, glycerol, urea, poly(alkylene) glycols and polyhydroxy acids.

8. The laminated film of claim 7, wherein the plasticizer is lactic acid or glycerol.

9. The laminated film of claim 8, wherein the plasticizer is lactic acid.

10. The laminated film of claim 8, wherein the plasticizer is glycerol.

11. The laminated film of claims 1 or 3, wherein at least one of said pectin layer or said chitosan layer is a pectin/chitosan HCl blend.

12. A film comprising a blend of pectin and chitosan HCl, wherein said pectin and said chitosan are present in amounts effective for the formation of a film, wherein said pectin has a high molecular weight, large radius of gyration, high degree of methyl esterification and high intrinsic viscosity at an ionic strangth of at least 0.05, and wherein said blend further comprises starch.

13. The film of claim 12, wherein said molecular weight is at least about 100,000, said radius of gyration is at least about 25 nanometers, said degree of methyl esterification is at least about 50%, and said intrinsic viscosity is at least about 2.1 dl/g.

14. The film of claim 12, wherein said starch is high amylose starch.

15. The film of claim 14, wherein said amylose is at least about 40% of the starch composition.

16. The film of claim 12, wherein said blend additionally comprises plasticizer.

17. The film of claim 16, wherein said plasticizer is selected from the group consisting of lactic acid, glycerol, urea, poly(alkylene) glycols and polyhydroxy acids.

18. The film of claim 17, wherein the plasticizer is lactic acid or glycerol.

19. The film of claim 18, wherein the plasticizer is lactic acid.

20. The film of claim 18, wherein the plasticizer is glycerol.

* * * * *